United States Patent
Evans

(10) Patent No.: US 9,085,992 B2
(45) Date of Patent: Jul. 21, 2015

(54) TURBOMACHINE CASING ASSEMBLY

(71) Applicant: ROLLS-ROYCE PLC, London (GB)

(72) Inventor: Dale Edward Evans, Derby (GB)

(73) Assignee: ROLLS-ROYCE plc, London (GB)

( * ) Notice: Subject to any disclaimer, the term of this patent is extended or adjusted under 35 U.S.C. 154(b) by 406 days.

(21) Appl. No.: 13/658,244

(22) Filed: Oct. 23, 2012

(65) Prior Publication Data

US 2013/0136577 A1 May 30, 2013

(30) Foreign Application Priority Data

Nov. 30, 2011 (GB) .................................... 1120557.2

(51) Int. Cl.
| | |
|---|---|
| *F01D 21/00* | (2006.01) |
| *F01D 21/04* | (2006.01) |
| *F04D 29/52* | (2006.01) |
| *F04D 27/02* | (2006.01) |

(52) U.S. Cl.
CPC .......... *F01D 21/045* (2013.01); *F04D 27/0292* (2013.01); *F04D 29/526* (2013.01); *Y02T 50/672* (2013.01)

(58) Field of Classification Search
CPC ... F01D 11/122; F01D 11/125; F01D 11/127; F01D 21/045; F01D 21/00; F04D 29/526; F04D 27/0292; Y02T 50/672
USPC ................................ 415/9, 173.4, 174.4, 200
See application file for complete search history.

(56) References Cited

U.S. PATENT DOCUMENTS 6,179,551 B1 * 1/2001 Sathianathan et al. ............ 415/9

FOREIGN PATENT DOCUMENTS

| EP | 1 083 300 A2 | 3/2001 |
|---|---|---|
| EP | 2 290 199 A2 | 3/2011 |
| EP | 2 305 985 A2 | 4/2011 |
| EP | 2 495 401 A2 | 9/2012 |

OTHER PUBLICATIONS

Jan. 24, 2013 European Search Report issued in European Application No. EP 12 18 9778.
Mar. 15, 2012 British Search Report issued in Application No. GB1120557.2.

* cited by examiner

*Primary Examiner* — Christopher Verdier
(74) *Attorney, Agent, or Firm* — Oliff PLC

(57) ABSTRACT

A turbomachine casing assembly includes a first casing element locatable radially outward of one or more rotating aerofoil elements of a turbomachine and a second casing element located radially distal to the first casing element, with a void being defined between the first and second casing elements. Each of the first and second casing elements includes, at a first end thereof, respective co-operating first and second interface portions. In the event that an aerofoil element becomes detached from the turbomachine and impacts the first casing element, the second interface portion; slides along the first interface portion and the first end of the first casing element enters the void.

14 Claims, 4 Drawing Sheets

TURBOMACHINE CASING ASSEMBLY

This invention claims the benefit of UK Patent Application No. 1120557.2, filed on 30 Nov. 2012, which is hereby incorporated herein in its entirety.

FIELD OF THE INVENTION

This invention relates to a turbomachine casing assembly and particularly, but not exclusively, to a casing assembly for the fan of a turbofan gas turbine engine.

BACKGROUND

Turbofan gas turbine engines for powering aircraft generally comprise inter alia a core engine, which drives a fan. The fan comprises a number of radially extending fan blades mounted on a fan rotor which is enclosed by a generally cylindrical fan casing.

There is a remote possibility with such engines that part or all of a fan blade could become detached from the remainder of the fan, for example as a result of the engine ingesting a bird or other foreign object.

It is known to provide the fan casing with a fan track liner which incorporates a containment system, designed to contain any released blades or associated debris. FIG. 1 shows a partial cross-section of such a fan track liner.

In the event of a "fan blade off" (FBO) event, the detached fan blade 8 travels radially outward, penetrating the attrition liner 10, septum 12 and aluminium honeycomb layer 14 until it reaches the metallic fan casing 16. The fan blade 8 then travels forwards where it is trapped by the hook 18. The fan track liner must therefore be relatively weak in order that any released blade or fragment thereof can penetrate sufficiently to be restrained axially whilst the liner distributes the load applied to the casing barrel as the radial restraint.

In addition to providing a blade containment system, the fan track liner includes an annular layer of abradable material which surrounds the fan blades. During operation of the engine, the fan blades cut a path into this abradable layer creating a seal against the fan casing and minimising leakage around the blade tips.

The fan track liner must also be resistant to ice impact loads. A rearward portion of the fan track liner is conventionally provided with an annular ice impact panel. This may typically be a glass-reinforced plastic moulding which may also be wrapped with GRP to increase its impact strength. Ice that forms on the fan blades is acted on by both centrifugal and airflow forces, which respectively cause it to move outwards and rearwards before being shed from the blades.

The geometry of a conventional fan blade is such that the ice is shed from the trailing edge of the blade, strikes the ice impact panel and is deflected without damaging the panel.

Swept fan blades are increasingly used in turbofan engines as they offer significant advantages in efficiency over conventional fan blades. Swept fan blades have a greater chord length at their central portion than conventional fan blades. This greater chordal length means that ice that forms on a swept fan blade follows the same rearward and outward path as on a conventional fan blade but may reach the radially outer tip of the blade before it reaches the trailing edge. It will therefore be shed from the blade tip and may strike the fan track liner forward of the ice impact panel.

A conventional fan track liner is generally not strong enough along its forward region to withstand ice impact and is therefore generally not suitable for use with swept fan blades. It is not possible simply to strengthen the fan track liner to accommodate ice impact, because this may disrupt the blade trajectory during an FBO event, and thereby compromise the operation of the fan casing containment system.

In recent years there has been a trend towards the use of thinner and lighter fan blades for performance. Thinner and lighter fan blades are more likely to buckle than to penetrate a fan track liner which has been optimised for swept fan blade ice impact durability. This may result in undesirable, forward ejection of high kinetic energy debris through the engine intake.

It is an objective of this invention to provide a gas turbine engine containment assembly that will substantially overcome the problems described above and that is suitable for use any fan blade design.

STATEMENTS OF INVENTION

According to a first aspect of the present invention there is provided a turbomachine casing assembly, comprising:
   a first casing element located radially outward of one or more rotating aerofoil elements of a turbomachine, and having a first, forward, end;
   a second casing element located radially distal to the first casing element, and having a first, forward, end; and
   a void, provided between the first casing element and the second casing element, at the first end of the first casing element;
   each of the first and second casing elements comprising, at the first end thereof, respective co-operating first and second interface portions;
   whereby upon failure of one of the rotating aerofoil elements, the second interface portion slides along the first interface portion and the first end of the first casing element enters the void.

The casing assembly of the present invention allows a shed fan blade to penetrate the first casing element at a first, or forward, end, whilst remaining impervious to ice impact the opposite, or rear, end. The competing requirements of fan blade ice shedding loads and fan blade off loads may thus be accommodated in a way that was not previously possible. The manner in which this is achieved allows for the potential to tune the casing assembly to optimally fulfil each requirement whilst simultaneously saving weight and easing manufacture.

In addition, by forming a void within the casing assembly, the weight of the assembly can be reduced. This increases the weight efficiency of the engine and makes it more attractive for aircraft applications.

Optionally, the first interface portion is formed as a first angled face which is inclined at a wedge angle to an axis of rotation of the one or more rotating aerofoil elements.

By providing the first interface portion as an angled face, inclined at an angle to the axis of rotation of the fan, it is possible to translate radially outward movement of the fan track liner into axial movement of the fan track liner in a direction parallel to the axis of rotation. Thus the impact of a detached fan blade striking the fan track liner causes a radially outward motion of the fan track liner which in turn is translated by the first interface portion into an axially rearward motion of the fan track liner.

It is not possible to position a means of controlling the radially outward motion of the fan track liner caused by the impact of a detached fan blade, behind the forward end of the liner itself. This is because it is necessary to provide a void behind this forward end into which the liner can deflect following the blade impact, in order to expose the hook and thereby trap the released blade.

However, in general, there are considerably fewer limitations on the available axial length of the casing assembly. This makes it possible for a means of controlling the radially outward motion of the fan track liner to be easily and conveniently packaged at a rear portion of the fan track liner.

Optionally, the second interface portion is formed as a second angled face which is inclined at the wedge angle.

The use of a second angled face at the first end of the first casing element, which is inclined at the same angle as the first angled face located at the first end of the second casing element enables the first and second angled faces to slide relative to one another as the first casing element moves radially outwards.

Optionally, the wedge angle is preferably between 30° and 45°.

By varying the inclination (or "wedge" angle) it is possible to vary the ratio between the radially outward and axially rearward motion of the fan track liner. For example, a wedge angle of 45° provides for a 1:1 ratio between these parameters.

In one embodiment of the invention, it may be advantageous to provide a mechanical advantage between the radially outward and axially rearward motion of the fan track liner, i.e. a radially outward movement translates into a larger axially rearward movement. This larger axial movement may then be more easily controlled by, for example, the use of conventional resilient elements, such as coil springs.

Optionally, the first and second casing elements extend circumferentially around the rotating aerofoil elements.

Since it is not possible to predict the circumferential position at which a fan blade may become detached, it can be advantageous to configure the casing assembly so as to completely encircle the rotating aerofoil elements.

Optionally, the first interface portion is formed as a curved face extending distally from the first end of the second casing element towards a second end of the second casing element.

By providing the first interface portion as a curved face, it becomes possible to provide a non-linear relationship between the radially outward and axially rearward movement of the fan track liner. In this way, it is possible to tailor the response of the fan track liner to predicted impact loadings.

Optionally, the second interface portion is formed as a convex protrusion at the first end of the distal face of the first casing element.

By forming the second interface portion at the forward end of the first casing element as a convex protrusion, it is possible to reduce the contact area between the first and second interface portions. This, in turn, allows for a reduction in the friction between these two portions which can make the casing assembly more responsive to impact loadings.

Optionally, the turbomachine casing assembly further comprises one or more resilient elements positioned between a second end of the first casing element and a second end of the second casing element.

The resilient elements can be arranged to absorb some or all of the loads resulting from the impact of a detached fan blade on the fan track liner.

Radially outward movement of the fan track liner exposes the hook, at the forward end of the second casing element and results in deformation of the resilient elements. The detached fan blade is then engaged by the exposed hook and trapped by the fan track liner as it is urged back to its original position by the energy stored in the resilient elements.

In one embodiment of the invention, the resilient elements take the form of a plurality of coil springs arranged with their axis parallel to the axis of rotation of the aerofoil elements.

In other embodiments, the resilient elements may take the form of conical springs (Belleville washers), leaf springs or shaped rubber elements.

The resilient elements may be pre-compressed prior to fitting the first casing element to the casing assembly. This simplifies fitting of the first casing element by sliding the first casing element rearwards, locating and securing the first casing element against the second casing assembly and then releasing the resilient elements.

Optionally, the turbomachine casing assembly further comprises one or more deformable elements positioned between the second end of the first casing element and the second end of the second casing element.

The deformable element at the second, or rearward, end of the fan track liner can absorb the energy resulting from the impact of a detached fan blade on the fan track liner.

Since the deformable element absorbs the impact energy by plastically deforming, it will remain in its deformed state following the dissipation of the energy associated with the impact event. In this way the hook at the forward end of the second casing element remains exposed following the impact event.

In one embodiment of the invention, the one or more deformable elements take the form of crushable tubes. Alternatively, the deformable elements may be honeycomb or foam materials.

Optionally, the radially proximal face of the first casing element is contiguous with a radially proximal face of the second casing element to form an uninterrupted surface.

This ensures that the internal surface of the casing assembly which includes inter alia the radially proximal faces of the first and second casing elements remains smooth and uninterrupted. Since this surface is washed by the gas flowing through the casing assembly, it is important that the surface is as aerodynamically smooth as possible in order to minimise any aerodynamic losses.

Optionally, at least one of the first and second interface portions comprises a surface coating such that a coefficient of friction of the at least one coated first and second interface portions is less than that of the respective at least one uncoated first and second interface portions.

By coating one or both of the matching first and second interface portions with a friction reducing material layer, it may be possible to reduce the coefficient of friction between the portions as they move relative to one another.

Optionally, the turbomachine casing assembly further comprises a plurality of first casing elements, each of the first casing elements being arranged as a circumferential array, each of the first casing elements having a first side and an opposite second side extending from the first end to the second end, the first side of each first casing element overlapping the second side of the respective adjoining first casing element.

By overlapping respective opposite sides of adjoining fan track liners, it becomes possible for the radially outward deflection of one fan track liner to initiate a corresponding radially outward deflection of a neighbouring liner element.

Any detached fan blade will have a circumferential velocity in addition to a radial velocity. Consequently, it is likely that the detached blade will impact several fan track liner elements before becoming trapped by the hook.

By ensuring that adjoining fan track liner elements overlap with one another, a detached fan blade is able to contiguously deflect a sequence of adjoining fan track liner elements without encountering a step between a deflected element and an undeflected element which might project the blade out of the engine.

Optionally, the wedge angle varies across at least one of the first casing elements from the first side to the second side.

A larger wedge angle will reduce the compliance of the first end of the first casing element to the impact of a detached blade. By decreasing the wedge angle across the width of the first casing element, in the direction of rotation of the rotating aerofoil elements, the compliance of the first casing element may be configured to increase across its width. This reduces the impact load required to initially deform a first edge of a first casing element which, in turn, makes it easier for a detached blade to transition between adjacent first casing elements.

Optionally, the first casing element comprising a rack disposed at the second end thereof, the second casing element comprising a corresponding pawl disposed at the second end thereof, and wherein in use the pawl engages with the rack to allow uni-directional movement of the first casing element along the axis of rotation.

Following the impact of a detached fan blade on a fan track liner element, it may be advantageous to ensure that each of the deflected liner elements remains in its deflected position. This will leave the hook portion exposed which may improve the blade retention capability of the hook.

According to a second aspect of the present invention there is provided a jet engine fan casing comprising the turbomachine casing assembly according to the first aspect of the invention.

According to a third aspect of the present invention there is provided a gas turbine comprising a turbomachine casing assembly according to the first aspect of the invention.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of preferred embodiments of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
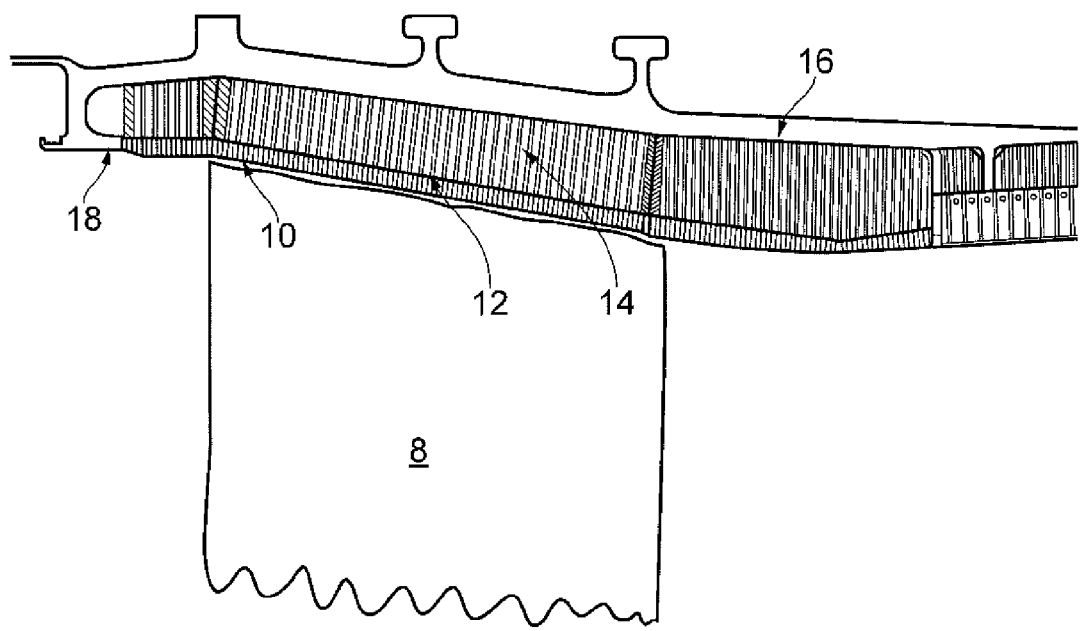
FIG. 1 shows a partial, sectional view of a conventional fan track liner as used in a gas turbine engine casing.
Figure 2:
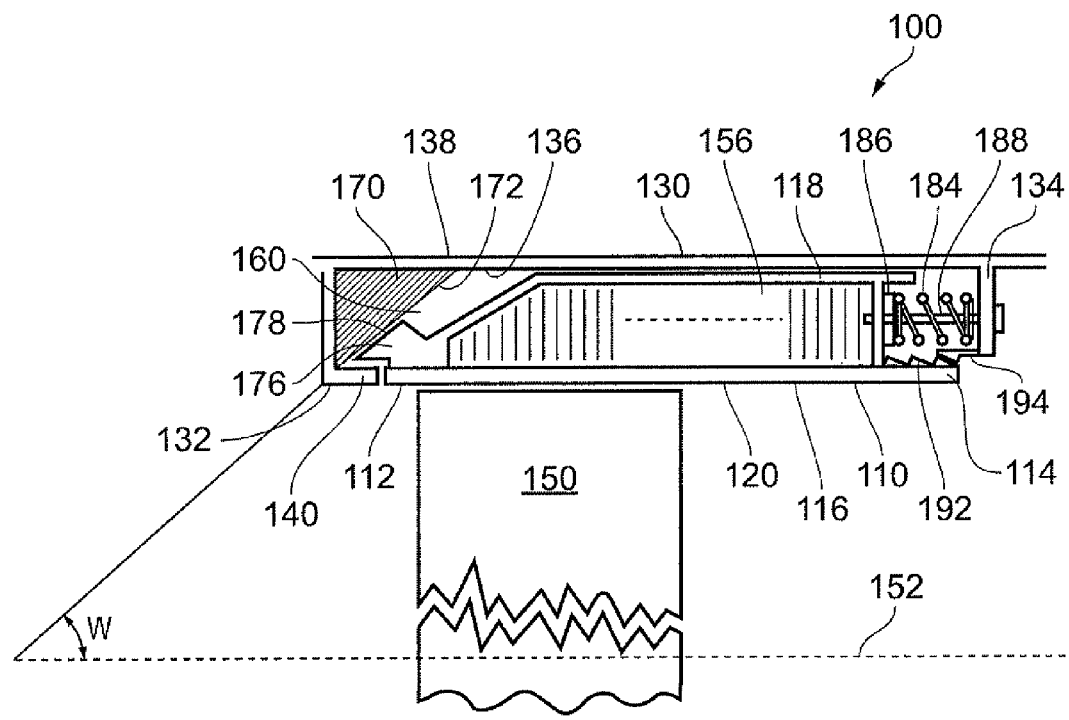
FIG. 2 shows a partial, sectional view of a fan casing assembly according to a first embodiment of the invention.
Figure 3:
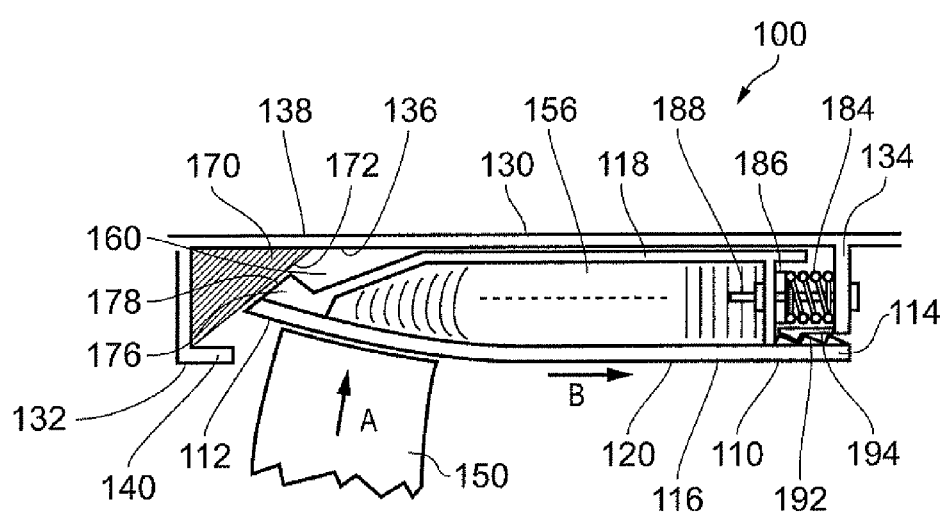
FIG. 3 shows a partial, sectional view of the fan casing assembly of FIG. 2 showing the impact of a fan blade.

Referring to FIGS. 2 and 3, a fan casing assembly according to a first embodiment of the invention is designated generally by the reference numeral 100 and comprises a first casing element 110 and a second casing element 130.

The first casing element 110 has a first end 112, a second end 114, a radially proximal face 116 and a radially distal face 118, and the second casing element 130 has a first end 132, a second end 134, a radially proximal face 136 and a radially distal face 138.

The first casing element 110 at least partially encloses one or more rotating aerofoil structures 150. These aerofoil structures 150 may comprise blades of a turbomachine, in particular compressor fan blades. The second casing element 130 is disposed radially distal to the first casing element 110.

The turbomachine casing assembly 100 comprises a plurality of first casing elements 110 circumferentially disposed about a curve defined by the blade tip path of the one or more aerofoil structures 150 of the turbomachine.

The first casing element 110 is typically formed as a filled Nomex honeycomb material, while the second casing element 130 may be metallic and may, for example, be formed of aluminium, titanium, steel or any other suitable metal.

Each first casing element 110 comprises a radially proximal face 116 in the form of an abradable layer 120. An infill member 156 is positioned between the first and second casing elements 110,130 and is attached to the abradable layer 120. An exemplary material for the abradable layer 120 is an epoxy resin, which may be curable at room temperature. The abradable layer 120 provides a surface against which the fan blade 150 is able to rub and cut a path for itself. For example, the fan blades 150 may rub against the abradable layer 120 and form a seal during normal engine operation.

The infill member 156 may be formed from a frangible or crushable structure, such as a foam or honeycomb material which provides structural reinforcement. The honeycomb material may be formed from a metal, such as aluminium, or from a non-metallic material, such as Nomex™ (a flame resistant aramid material).

In an alternative embodiment of the invention, the infill member 156 may be formed separately from the first casing element 110, and positioned between the first and second casing elements 110,130.

Optionally, a septum layer (not shown) may be provided as an interlayer between the abradable layer 120 and the infill member 156. The septum layer may be metallic or may be formed from a carbon fibre or glass fibre reinforced composite material.

As shown in FIG. 2, the forward portion of the radially distal face 118 of the first casing element 110 is angled relative to the corresponding radially proximal face 136 of the second casing element 130 such that a void 160 is defined between the first and second casing elements 110,130 at their forward, or first, ends 112,132.

The second casing element 130 comprises a fan blade retaining feature 140 disposed at a forward, or first, end 132 thereof, in the form of a hooked portion 140. The hooked portion 140 extends radially inwardly and then axially in a rearward direction.

A first interface portion 170 in the form of a first angled face 172 is located at the first end 132 of the second casing element 130. The first angled face 172 is oriented at a wedge angle W to the axis of rotation 152 of the rotating aerofoil structures 150.

In this embodiment of the invention, the wedge angle W is 30°, i.e. the first angled face is angled at 30° to the axis of rotation.

A second interface portion 176 in the form of a second angled face 178 is located at the first end 112 of the first casing element 110. The second angled face 176 is also oriented at a wedge angle W to the axis of rotation 152, and is in sliding contact with the first angled face 172.

Figure 6:
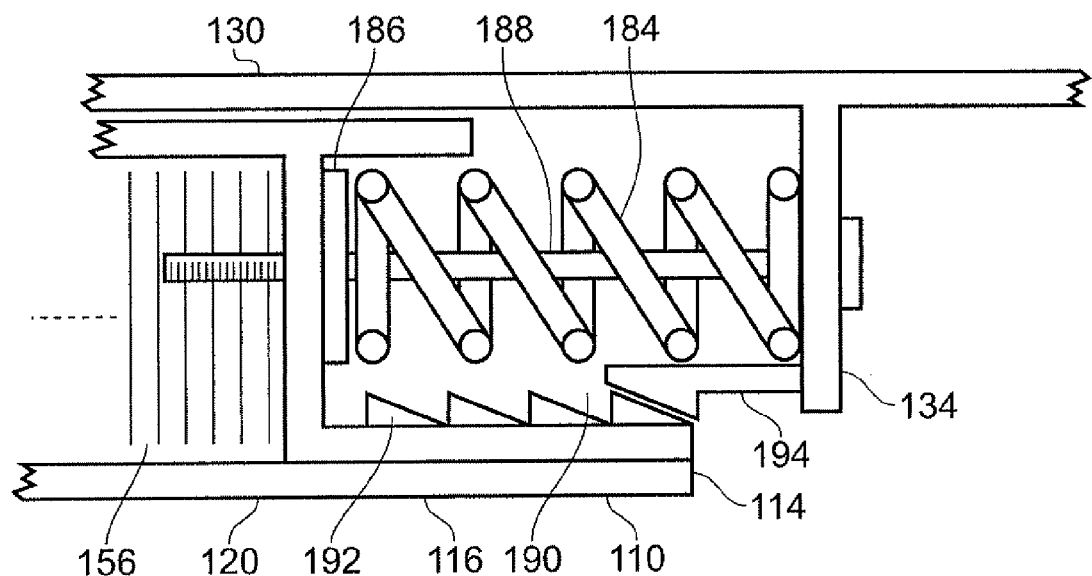
FIG. 6 shows a partial, sectional view of a fan casing assembly according to either of the first and second embodiments of the invention showing the ratchet retention feature.

As illustrated in FIG. 6, a resilient element 184 is positioned at the second end 114 of the first casing element 110. In this embodiment, the resilient element 184 takes the form of a plurality of coil springs 184 arranged with their axes parallel to the axis of rotation 152. Each coil spring 184 extends between the second end 114 of the first casing element 110 and the second end 134 of the second casing element 130. A spring platform 186 is positioned between the spring 184 and the second end 114 of the first casing element 110. Each spring 184 is located between the second ends 114,134 of the first and second casing elements 110,130 by a respective guide post 188.

A ratchet retention mechanism 190 is provided at the juncture of the second ends 114,134 of the first and second casing elements 110,130, as shown in FIG. 6. This mechanism 190 takes the form of a linear rack 192 which is disposed at the second end 114 of the first casing element 110 and a pawl 194 disposed on the second end 134 of the second casing element 130. The pawl 194 engages with the rack 192 such that the first casing element 110 is able to move axially rearwards (i.e. in a direction from the first end to the second end) but is not able to return to its original position.

In use, when a fan blade 150 becomes detached, it travels in a generally radially outward direction as indicated by the arrow A in FIG. 3. The detached blade first strikes the radially proximal face 116 of the first end 112 of the first casing element 110. This impact causes the first end 112 to deflect radially outwards, exposing the hook 140. As the first end 112 moves radially outwards, the second angled face 178 slides along the first angled face 172 which results in the first casing assembly 110 moving axially rearwards, as indicated by the arrow B in FIG. 3.

In its undeformed configuration, the first and second angled faces 172,178 are positioned flush to one another. Following the impact of a detached fan blade 150, the first end 112 of the first casing element 110 deforms radially outwards. This results in the area of contact between the first and second angled faces 172,178 changing from an area of contact to a line of contact, thus reducing the frictional force between the two faces 172,178. This ensures that, once the first casing element 110 has been initially deflected sufficiently by a detached fan blade 150, the deformation continues in order to arrest the fan blade 150 in the casing assembly 100.

The energy associated with the impact event is then transferred to and absorbed by the springs 184. As the first casing element 110 moves axially rearwards, the ratchet retention mechanism operates (i.e. the pawl 194 engages with the rack 192) to prevent the first casing element 110 from returning to its original position once the impact energy has been absorbed by the springs 184. As the detached blade 150 continues to travel radially outwards, the blade tip engages with the hook 140 and subsequently becomes arrested by the casing assembly 100. In other words, the kinetic energy is removed from the detached blade 150.

Figure 4:
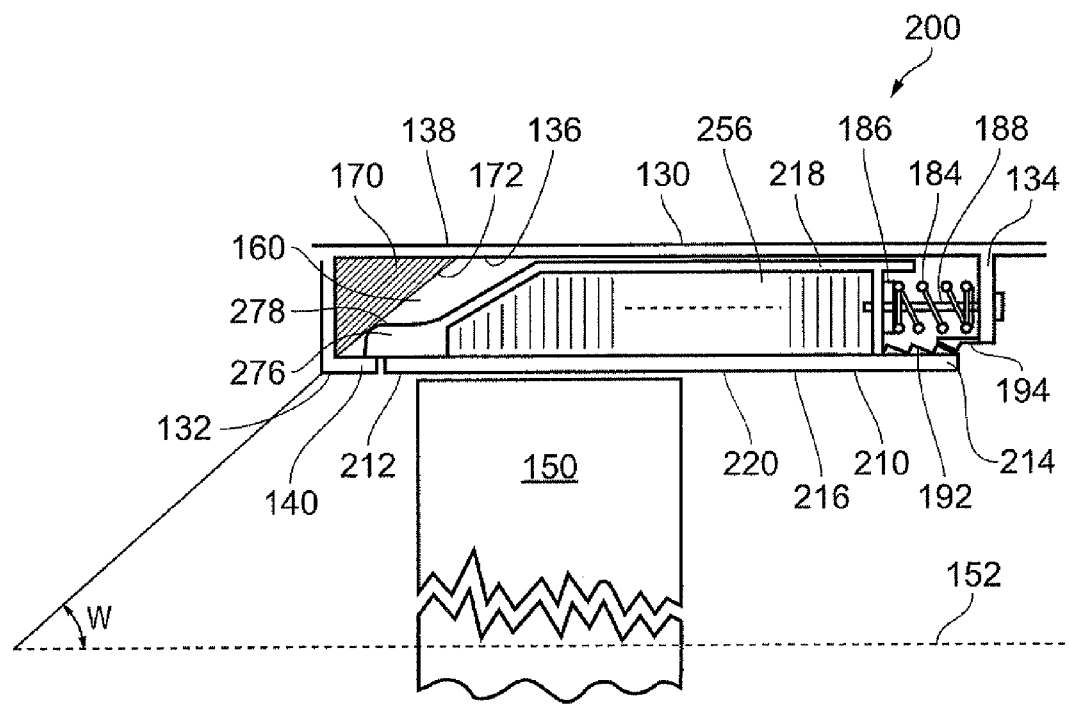
FIG. 4 shows a partial, sectional view of a fan casing assembly according to a second embodiment of the invention.
Figure 5:
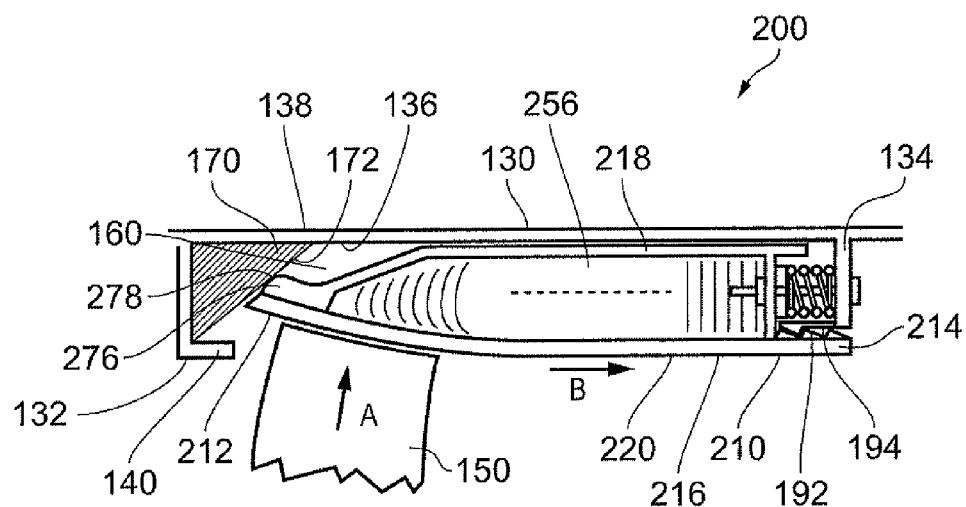
FIG. 5 shows a partial, sectional view of the fan casing assembly of FIG. 4 showing the impact of a fan blade.

Referring to FIGS. 4 and 5, a fan casing assembly according to a second embodiment of the invention is designated generally by the reference numeral 200. Features of the fan casing assembly 200 which correspond to those of fan casing assembly 100 have been given corresponding reference numerals for ease of reference.

The fan casing assembly 200 has a first casing element 210 and a second casing element 130.

In this embodiment, the first casing element 210 has a first end 212, a second end 214, a radially proximal face 216 and a radially distal face 218. The radially proximal face 216 comprises an abradable layer 220. The radially distal face 218 of the first casing element 210 corresponds to the radially proximal face 136 of the second casing element 130.

The radially proximal and distal faces 216,218 of the first casing element 210 are spaced apart from one another with an infill member 256 positioned therebetween.

A second interface portion 276 in the form of a convex protrusion 278 is located at the first end 212 of the first casing element 210. The convex protrusion 278 is arranged in sliding contact with the first angled face 172.

The remaining features of the second embodiment, such as, for example, the resilient elements and ratchet retention mechanism, are identical to the corresponding features of the first embodiment as previously described.

In use, a detached fan blade 150 travels in a generally radially outward direction as indicated by the arrow A in FIG. 5. The detached blade first strikes the radially proximal face 216 of the first end 212 of the first casing element 210. This impact causes the first end 212 to deflect radially outwards, exposing the hook 140. As the first end 212 moves radially outwards, the convex protrusion 278 slides along the first angled face 172 which results in the first casing assembly 210 moving axially rearwards, as indicated by the arrow B in FIG. 5.

The energy associated with the impact event is then transferred to and absorbed by the springs 184. As the first casing element 210 moves axially rearwards, the ratchet retention mechanism operates (i.e. the pawl 194 engages with the rack 192) to prevent the first casing element 210 from returning to its original position once the impact energy has been absorbed by the springs 184. As the detached blade 150 continues to travel radially outwards, the blade tip engages with the hook 140 and subsequently becomes arrested by the casing assembly 200.

Figure 7:
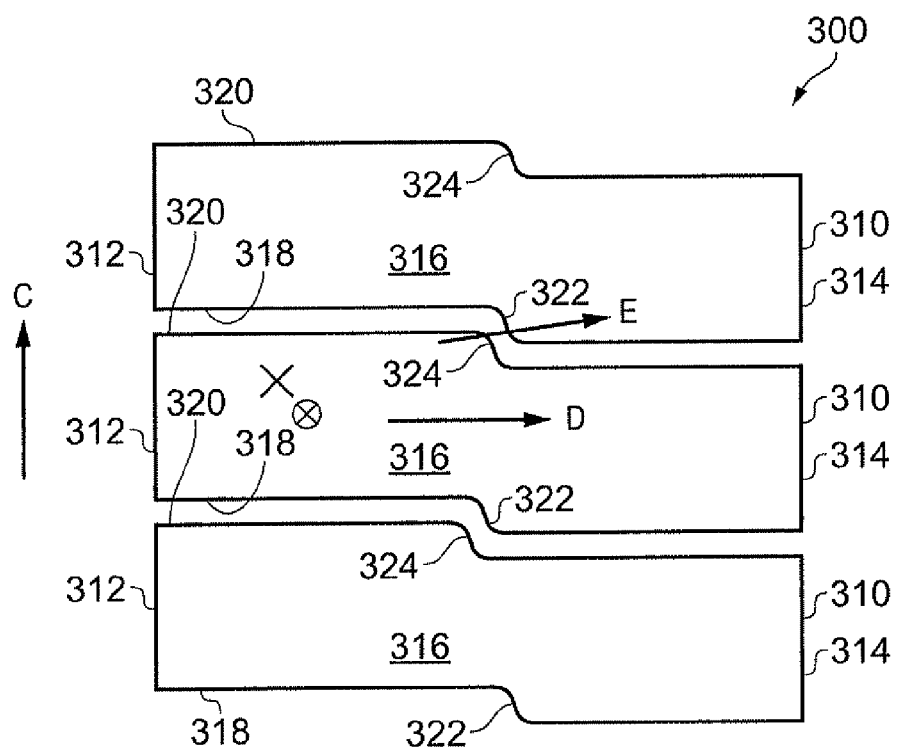
FIG. 7 shows a partial, schematic view of the first casing elements of a fan casing assembly according to a third embodiment of the invention.

Referring to FIG. 7, a fan casing assembly according to a third embodiment of the invention is designated generally by the reference numeral 300. Features of the fan casing assembly 300 which correspond to those of fan casing assembly 100 have been given corresponding reference numerals for ease of reference.

The fan casing assembly 300 has a plurality of first casing elements 310 each comprising a first end 312, a second end 314 and a radially proximal face 316. The first casing elements 310 further comprise a first edge 318 and an opposite second edge 320; the first and second edges 318,320 each extending from the first end 312 to the second end 314.

Each of the first and second edges 318,320 comprises a respective first and second edge step 322,324 located at a mid-portion thereof. Each first edge step 322 on the first edge 318 of a first casing element 310 co-operates with the second edge step 324 on the second edge 320 of the adjoining first casing element 310.

FIG. 7 shows a partial, schematic view on the radially proximal faces 316 of the first casing elements 310 viewed in a radially outward direction with the direction of motion of the fan blades indicated by the arrow C.

In use, when a detached fan blade (not shown) impacts a first casing element at point X, the relative motion of first and second interface portions 170,176; 276 causes the first casing element 310 to move in the direction indicated by arrow D. This motion is then transferred by the co-operating second and first edge steps 324,322 to the adjoining first casing element 310 as indicated by the arrow E. In this way, there is a contiguous radial outward deformation of the first casing elements 310 and the detached fan blade does not encounter a step between adjoining first casing elements which might hinder its arrest in the casing assembly 100.

The casing assemblies disclosed herein are equally applicable to solid and hollow fan blades and may be used with light-weight (hollow line-core or solid composite) fan blades. The casing assemblies may also be used with aerofoil structures, e.g. fan blades, comprising a foreign object damage resistant member at the front of the aerofoil structure, such as a picture frame or metallic sheath. The present disclosure may also be applied to swept or unswept aerofoil structures.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A turbomachine casing assembly, comprising:
   one or more rotating aerofoil elements of a turbomachine, having an axis of rotation;
   a first casing element located radially outward of the one or more rotating aerofoil elements, and having a first, forward, end;
   a second casing element located radially distal to the first casing element, and having a first, forward, end; and
   a void, provided between the first casing element and the second casing element, at the first end of the first casing element;
   each of the first and second casing elements comprising, at the first end thereof, respective co-operating second and first interface portions;
   whereby upon failure of one of the rotating aerofoil elements, the second interface portion slides along the first interface portion and the first end of the first casing element enters the void; wherein
      the first casing element comprises a rack disposed at a second end thereof, the second casing element comprises a corresponding pawl disposed at a second end thereof, and wherein in use the pawl engages with the rack to allow uni-directional movement of the first casing element along the axis of rotation.

2. The turbomachine casing assembly as claimed in claim 1, wherein the first interface portion is formed as a first angled face which is inclined at a wedge angle to the axis of rotation.

3. The turbomachine casing assembly as claimed in claim 2, wherein the second interface portion is formed as a second angled face which is inclined at the wedge angle.

4. The turbomachine casing assembly as claimed in claim 2, wherein the wedge angle is between 30° and 45°.

5. A turbomachine casing assembly as claimed in claim 2, wherein the second interface portion is formed as a convex protrusion at the first end of the distal face of the first casing element.

6. A turbomachine casing assembly as claimed in claim 1, wherein the first and second casing elements extend circumferentially around the rotating aerofoil elements.

7. The turbomachine casing assembly as claimed in claim 1, wherein the first interface portion is formed as a curved face extending distally from the first end of the second casing element towards a second end of the second casing element.

8. A turbomachine casing assembly as claimed in claim 1, further comprising one or more resilient elements positioned between a second end of the first casing element and a second end of the second casing element.

9. A turbomachine casing assembly as claimed in claim 1, further comprising one or more deformable elements positioned between a second end of the first casing element and a second end of the second casing element.

10. A turbomachine casing assembly as claimed in claim 1, wherein a radially proximal face of the first casing element is contiguous with a radially proximal face of the second casing element to form an uninterrupted surface.

11. A turbomachine casing assembly as claimed in claim 1, wherein at least one of the first and second interface portions comprises a surface coating such that a coefficient of friction of the at least one coated first and second interface portions is less than that of the respective at least one uncoated first and second interface portions.

12. A turbomachine casing assembly as claimed in claim 1, comprising a plurality of first casing elements, each of the first casing elements being arranged as a circumferential array, each of the first casing elements having a first side and an opposite second side extending from the first end to the second end, the first side of each first casing element overlapping to the second side of the respective adjoining first casing element.

13. A turbomachine casing assembly as claimed in claim 12, wherein a wedge angle varies across at least one of the first casing elements from the first side to the second side.

14. A jet engine fan casing comprising the turbomachine casing assembly as claimed in claim 1.

* * * * *